United States Patent [19]
Ilardo et al.

[11] 4,388,429
[45] Jun. 14, 1983

[54] FLAME RETARDANT POLYMER COMPOSITIONS

[75] Inventors: Charles S. Ilardo, Tonawanda; Daniel J. Scharf, East Amherst, both of N.Y.

[73] Assignee: Occidental Chemical Corporation, Niagara Falls, N.Y.

[21] Appl. No.: 257,082

[22] Filed: Apr. 24, 1981

[51] Int. Cl.$^3$ .......................... C08K 5/02; C08K 5/15; C08K 5/34

[52] U.S. Cl. ..................................... 524/94; 524/111; 524/371; 524/466; 524/467; 524/469; 525/132; 528/212

[58] Field of Search ................. 260/45.7 RL, 45.95 G; 525/132; 524/94, 371, 467, 111

[56] References Cited

U.S. PATENT DOCUMENTS

| | | | |
|---|---|---|---|
| 2,760,947 | 8/1956 | Werkema et al. | 260/45.7 RL |
| 3,403,036 | 9/1968 | Hindersinn et al. | 106/18.24 |
| 3,431,238 | 3/1969 | Borman | 525/132 |
| 3,591,507 | 7/1971 | Drake et al. | 260/45.75 B |
| 3,632,544 | 1/1972 | Boyer | 260/45.8 A |
| 3,699,077 | 10/1972 | Murray | 260/45.7 RL |
| 3,828,003 | 8/1974 | Yamazaki et al. | 260/45.7 RL |
| 3,950,456 | 4/1976 | Newcombe | 260/45.7 RL |
| 3,981,936 | 9/1976 | Petersen et al. | 260/45.7 RL |
| 3,989,531 | 11/1976 | Orlando et al. | 525/132 |
| 4,000,114 | 12/1976 | Gordon et al. | 260/45.7 RL |
| 4,067,930 | 1/1978 | Versnel et al. | 260/45.7 RL |
| 4,101,498 | 7/1978 | Snyder | 260/45.7 RL |
| 4,147,741 | 4/1979 | Slama et al. | 260/45.7 RL |

FOREIGN PATENT DOCUMENTS 1287934 9/1972 United Kingdom .

Primary Examiner—John Kight, III
Assistant Examiner—R. A. White
Attorney, Agent, or Firm—James F. Tao; Arthur S. Cookfair

[57] ABSTRACT

Polyolefins such as polyethylene, polypropylene, and the like are rendered flame retardant by incorporating therein about 2-60 percent of a combination of (1) a Diels-Alder adduct of a chlorinated cyclopentadiene and a polyunsaturated cycloaliphatic compound and (2) a brominated aromatic compound.

13 Claims, No Drawings

FLAME RETARDANT POLYMER COMPOSITIONS

BACKGROUND OF THE INVENTION

This invention relates to flame retardant polyolefin compositions.

Polyolefin compositions are finding increasing use in a diversity of applications such as wire coatings, pipes, conduits, automotive products, marine products, fibers, coatings, industrial moldings, extensions, and various other products. These and other uses are often better served by polyolefin compositions that are flame retardant. Many prior art attempts to impart fire retardance to such compositions by the use of additives have adversely affected the desirable properties of the polymer or coating, due to the high proportions of fire retardant additive often required to be used to achieve an adequate level of fire retardancy. In addition, prior products have often been adversely affected, due to the migratory properties and sensitivity to environmental conditions of the fire retardant additives used.

Accordingly, it is an object of this invention to provide fire retardant polyolefin compositions. Additionally, it is an object of this invention to provide such polyolefin compositions containing additives that not only inpart constant fire resistance but also enhance or preserve other physical properties of the protected composition.

SUMMARY OF THE INVENTION

In accordance with this invention, polyolefin compositions are rendered flame retardant by incorporating therein about 2-60 percent by weight of a combination of (1) a chlorinated organic component which is a compound of the formula

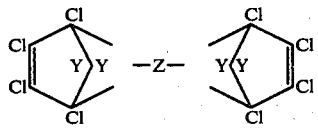

wherein Y is selected from the group consisting of chlorine, fluorine, alkyl and alkoxy, Z is a tetravalent cyclic hydrocarbon having at least 5 carbon atoms, Z may be substituted by lower alkyl of 1 to 6 carbon atoms, chlorine or fluorine. The alkyl and alkoxy radicals mentioned generally have 1 to 10 carbon atoms and preferably are of 1 to 6 carbon atoms. Z is a cyclic hydrocarbon of 5 to 18 carbon atoms and from 1 to 5 cyclic structures. When Z is a plurality of cyclic structures, they are fused, that is, share carbon atoms, and (2) a brominated aromatic component selected from the group consisting of ring brominated aromatic polyesters; aromatic anhydrides; aromatic imides; phenols; benzenes; naphthalenes; polyphenyls; and aromatic substituted poly alkylenes; wherein the chlorinated and brominated components are present in a ratio of about 10:1 to about 0.1:1.

Both the chlorinated and the brominated components described herein include various materials known to be useful as flame retardant additives for various compositions. However, it has now been found and is exemplified hereinbelow, that the combination of chlorinated and brominated components, when incorporated in a polyolefin flame composition, acts in a synergistic fashion, to provide a surprisingly higher degree of flame retardance than comparable additive compositions of either component individually.

The compounds that may be employed as the chlorinated organic component of the synergistic flame retardant additives of this invention are Diels-Alder adducts of chlorinated cyclopentadiene. Generally such compounds will have a melting point above about 250 degrees Celsius, a vapor pressure of less than about 0.10 millimeters of mercury at 197 degrees Celsius and a chlorine content of at least about 40 percent. Suitable compounds are described in detail in U.S. Pat. Nos. 3,403,036 and 4,000,114, the disclosures of which is incorporated by reference herein. Such compounds may be made by adducting (Diels Alder reaction) one mole of a polyunsaturated cycloaliphatic or heterocyclic compound and two or more moles of a polyhalogenated cyclopentadiene of the formula

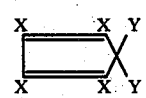

X and Y have the same definition as previously stated. The polyunsaturated cycloaliphatic compound mentioned above contains 5 to 18 carbon atoms, has 1 to 5 cyclic structures and when more than one, the cyclic structures are fused and at least two sites of carbon to carbon unsaturation which may be either ethylenic or acetylenic.

Illustrative of the polyhalogenated cyclopentadienes suitable for use in this invention are hexachlorocyclopentadiene, 5,5-dimethoxytetrachlorocyclopentadiene, 5,5-difluorotetrachlorocyclopentadiene, 5,5-dibromotetrachlorocyclopentadiene, and 5,5-diethoxytetrachlorocyclopentadiene.

Satisfactory polyunsaturated aliphatic compounds for use in preparing the Diels-Alder adduct with

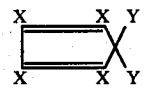

include cycloaliphatic compounds exemplified by but not limited to methyl cyclopentadiene, cyclopentadiene, dicyclopentadiene, bicyclo(2.2.1)heptadiene, 1,5-cyclooctadiene, cyclodecadiene and cyclododecadiene. Suitable polyunsaturated heterocyclic compounds include the furans and thiophenes.

The preparation of 1,4,7,10-dimethanocycloocta-1,2,3,4,7,8,9,10,13,13,14,14-dodecachloro-1,4,4a,5,6-,6a,7,10,10a,11,12,12-dodecahydro,(1,2,5,6)dibenzene is disclosed by Ziegler and Froitzheim-Kuhlhorn, Annalen, vol. 589, page 157 (1954). This compound's structure is believed to be

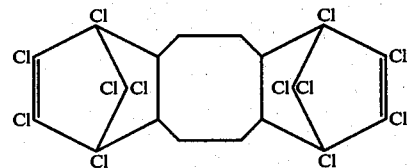

For convenience this compound will be referred to by the short title of 1,5 COD. The adduct is prepared by condensing two moles of hedachlorocyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,6,7,8,9,13,13,14,14-dodecachloro-1,4:5, 10:6,9-trimethano-11H-benzo(b)-fluorene is prepared by condensing two moles of hexachlorocyclopentadiene with one mole of dicyclopentadiene. The adduct has the assigned structure:

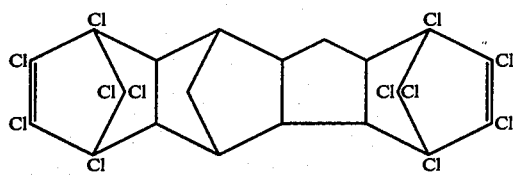

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11-dodecachloro-1,4:5,8-dimethanofluorene is prepared by condensing two moles of hexachlorocyclopentadiene with one mole of cyclopentadiene. This adduct has the assigned structure

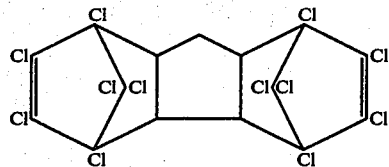

for convenience this adduct will be referred to as Cp. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13-dodecachloro-1,4:5,8:9,10-trimethano-anthracene is prepared by condensing one mole of the Diels-Alder adduct of cyclopentadiene and acetylene with two moles of hexachlorocyclopentadiene. The resulting adduct has the assigned structure:

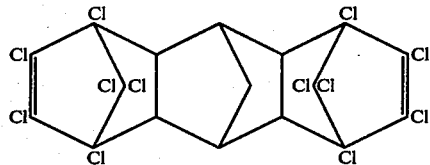

For convenience this adduct will be referred to as BCH. BCH melts at about 340 degrees centigrade and has a vapor pressure of 0.008 millimeter of mercury at 197 degrees centigrade.

Compounds that may be employed as the brominated aromatic component include ring brominated aromatic polyesters; aromatic anhydrides; aromatic imides; phenols; benzenes; naphthalenes; polyphenyls; and aromatic substituted polyalkylenes. Typical of such ring brominated aromatic compounds are the following:

Monocyclic compounds (bromobenzenes) of the formula

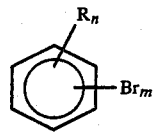

where n is 0-5, m is 1-6; and R is hydrogen, alkyl, phenyl, benzyl, alkoxy, phenoxy, alkenyl, fluorine, chlorine, halophenyl, or halophenoxy. Typical compounds of this class are monobromobenzene, pentabromobenzene, hexabromobenzene, tribromoanisole, tribromophenoxybenzene, pentabromochlorobenzene, and the like.

Brominated polycyclic compounds of the formulae

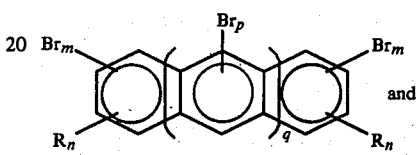

and

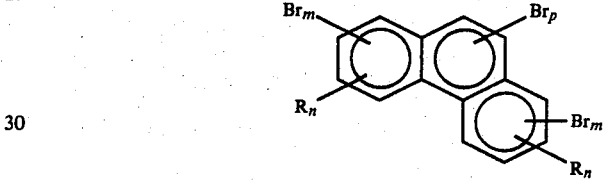

where R is as defined above; m is 1-4; n is 0-2; p is 1-2; and g is 0 or 1. Typical compounds of this class include, for example, monobromonaphthalene; dibromonaphthalene; tribromonapthalene; tetrabromonaphthalene; monobromoanthracene; dibromoanthracene; tribromoanthracene; monobromophenanthrene; dibromophenanthrene; tetrabromophenanthrene and the like.

Brominated polyphenyl compounds of the formula

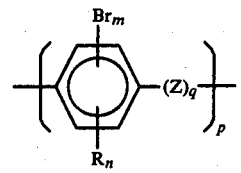

where R is as defined above; m is 1-4; n is 0-2; p is greater than one; and q is 0 or 1; and Z is O, S, N, SO₂, alkylene

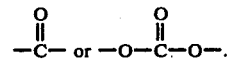

Typical compounds of this class include for example pentabromodiphenyl oxide, hexabromodiphenyl oxide, octabromodiphenyl oxide, decabromodiphenyl oxide, polydibromophenylene oxide, polybromobiphenyl, polybromopolyphenylene, polybromopolyphenyl methylene, and the like.

Brominated aromatic-substituted polyalkylenes of the formula

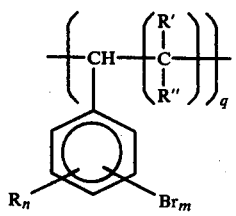

where R is as defined above; R' is alkyl, preferably 1-4 carbon atoms, hydrogen or phenyl; R" is alkyl, preferably 1-4 carbon atoms, hydrogen, or phenyl; m is 1-5; n is 0-2; and q is greater than 1.

Brominated polyesters of the formula

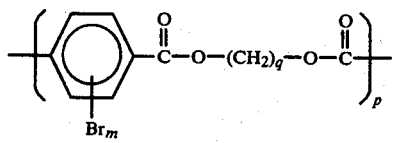

where m is 1-4; p is greater than 1; and q is 1-6. Typical compounds of this class include, for example, polyethylene (polybromo) terephthalate; polybutylene (polybromo) terephthalate; and the like.

Brominated aromatic anhydrides of the formula

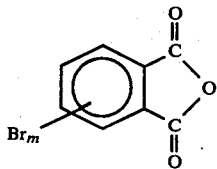

where m is 1-4, including, for example tetrabromophthalic anhydride.

Brominated imides, such as those characterized by the formula

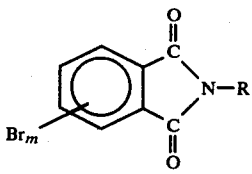

where m is 1-4; and R is H, alkyl, phenyl, halophenyl, benzyl, halobenzyl, or a halogen substituted alkylene imido of the formula

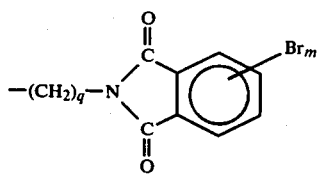

where m is 1-4 and q is greater than zero. Typical compounds of this class include, for example, bis(tetrabromophthalimido)ethane; bis(tetrabromophthalimido)methane; N-phenyl tetrabromophthalimide.

Brominated bisphenols of the formula

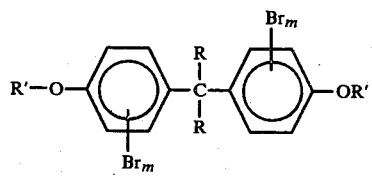

where m is 1-4; R is as defined above; and R' is hydrogen, alkyl, hydroxyl alkyl, phenyl, benzyl, or a carboxylate linkage. The latter is illustrative of a type of polycarbonate structure prepared by the reaction of brominated bisphenol A with phosgene. Typical brominated bisphenols include for example, tetrabromo bisphenol A, and bis (hydroxyethyl ether) tetrabromo bisphenol A.

The polymeric compositions and coatings of this invention include high molecular weight polymers and resins as well as the intermediate molecular weight materials utilized for coatings and paints. The polymers embraced within the scope of this invention include the homopolymers and copolymers of unsaturated aliphatic hydrocarbons, including, for example polyethylene, polypropylene, and ethylene/propylene copolymers. The polymers of the invention can be in various physical forms, such as shaped articles, for example, moldings, sheets, rods, and the like; fibers, coatings, films and fabrics, and the like.

Two of the polymers that are particularly suitable for the fire retardant polymer compositions of this invention, polyethylene and polypropylene, are well known in the art. Low-density (0.92 grams/cc.) polyethylene may be produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcett et al., Chemical Abstracts, 32, 1362 (1938).

In recent years a new field of linear and stereoregular polymers, has become available which are suitable for use in this invention. Polymers such as polypropylene are produced with organometallic catalysts and supported metal oxide catalysts as disclosed in great detail in Linear and Steroregular Addition Polymers: Polymerization With Controlled Propagation, Gaylord, N. G. and Mark, H. F. Interscience Publishers, Inc. (1959). Monomers of the type disclosed hereinbefore are readily polymerized to solid polymers in the presence of a catalyst system comprising aluminum triethyl and titanium tetrachloride or titanium trichloride. The reaction is carried out in the presence of an inert hydrocarbon diluent, suitably purified of catalyst poisons, at a temperature in the range of fifty to two hundred and thirty degrees centigrade. At the conclusion of the reaction, the polymer can be recovered from the resulting solution of suspension by evaporation of the diluent, whereupon the polymer is treated for removal of catalyst residues, for example, by washing with water or alcohol and acids. Metal oxide catalysts, such as chromium oxide supported on silica or alumina, are suitable for polymerizing 1-olefins containing a maximum of eight carbon atoms, with no branching closer to the double bond than the 4-position. Such polymerization may be carried out in the manner described for the organometallic catalyst system.

The chlorine-bromine containing additives of this invention may be incorporated into the polymer in a variety of ways. For example, the additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer, e.g., from 70 to 600 degrees centigrade. Alternatively, the additives and polymer are dry-blended in the finely-divided state so that an intimate mixture is obtained upon subsequent milling or extrusion.

The combination additive of the invention, that is the combination of the chlorinated and brominated components is incorporated in the polymeric material in an effective fire retardant proportion. Generally, the combination of halogenated components is incorporated in the amount of about 2 to about 60 percent by weight of the polymeric composition and desirably from about 5 to about 50 percent by weight of the polymer composition and preferably from about 10 to about 40 percent by weight of the total polymer composition. Within the chlorine and bromine-containing additive mixture, the proportion of chlorinated and brominated components will vary depending on the particular compounds employed, but should provide a preferred weight ratio of chlorine:bromine of between about 10:1 and about 0.1:1 and most preferably about 3:1 to about 0.3:1.

In a most preferred mode, still further improvements in fire retardance of the polymer compositions can be provided by incorporating metallic compounds wherein the metal is selected from the group consisting of antimony, arsenic and bismuth, in the polymeric compositions in the amount of about 1 to about 30 percent by weight of said total composition, preferably about 2 to 25 percent.

Antimony oxide is the antimony compound that is presently preferred for use in the present invention. However, many antimony compounds are suitable. Suitable antimony compounds include the sulfides of antimony, salts of the alkali metals of Group 1 of the Periodic Table, antimony salts of organic acids and their pentavalent derivatives and the esters of antimonius acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnate, antimony anisate, and their pentavalent dihalide derivatives. Likewise, the esters of antimonius acids and their pentavalent derivatives disclosed in U.S. Pat. No. 2,993,924 such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth.

The following specific examples are provided to further illustrate this invention and the manner in which it may be carried out. It will be understood, however, that the specific details given in the examples have been chosen for purpose of illustration and are not to be construed as a limitation on the invention. In the examples, unless otherwise indicated, all parts and percentages are by weight and all temperatures are in degrees Celsius.

EXAMPLE 1

Sixty parts of general purpose polypropylene, were banded on a two roll rubber mill, operated at about 177°–181° C. To the banded polypropylene was added 15 parts of 1,5 COD, 15 parts of decabromodiphenyl oxide, 5 parts of antimony oxide and 5 parts of zinc borate. Mixing was continued until the mixture was uniform. The milled sheet was then granulated and the granules were injection molded at 240°–232° C. into $\frac{1}{8}"\times 5"\times\frac{1}{2}"$ bars. The bars were tested for oxygen index following the procedure of ASTM-D-2863-30.

Following a similar procedure, using varying proportions of components, a series of fire retardant polypropylene samples were prepared and tested, with the results as shown in Table I, below.

TABLE I

| Composition(Parts by weight) | EXAMPLES | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Polypropylene | 60 | 60 | 60 | 60 | 60 | 60 | 60 | 60 | 60 | 60 | 60 | 60 | 60 | 60 | 60 | 60 |
| Antimony trioxide | 5 | 5 | 5 | 5 | 5 | 10 | 5 | 5 | 5 | 5 | 10 | 5 | 5 | 5 | 5 | 10 |
| Zinc borate | 5 | 5 | 5 | 5 | 5 | — | 5 | 5 | 5 | 5 | — | 5 | 5 | 5 | 5 | — |
| 1,5 COD | 15 | 30 | 20 | 12.5 | 10 | — | | | | | | 30 | 22.5 | 15 | 7.5 | — |
| BCH Diadduct of hexachlorocyclopentadiene and Furan | | | | | | | 30 | 22.5 | 15 | 7.5 | — | | | | | |
| Decabromodiphenyl oxide | 15 | — | 10 | 17.7 | 20 | 30 | — | 7.5 | 15 | 22.5 | 30 | — | 7.5 | 15 | 22.5 | 30 |
| Oxygen index | 31.3 | 27.9 | 29.0 | 32.4 | 28.2 | 27.2 | 29.4 | 30.4 | 30.8 | 30.3 | 29.3 | 29.1 | 29.6 | 28.3 | 27.5 | 29.3 |

EXAMPLES 17-21

Following the procedure of the preceeding examples, a series of fire retardant polypropylene compositions were prepared employing polydibromophenylene oxide as the brominated component. The compositions and test results are set forth in Table II below.

TABLE II

| | EXAMPLES | | | | |
|---|---|---|---|---|---|
| Composition(parts by weight) | 17 | 18 | 19 | 20 | 21 |
| Polypropylene | 60 | 60 | 60 | 60 | 60 |
| Antimony trioxide | 5 | 5 | 5 | 5 | 5 |
| Zinc borate | 5 | 5 | 5 | 5 | 5 |
| 1,5 COD | 30 | 22.5 | 15 | 7.5 | — |
| Polydibromophenylene Oxide | — | 7.5 | 15 | 22.5 | 30 |

TABLE II-continued

| Composition(parts by weight) | EXAMPLES | | | | |
|---|---|---|---|---|---|
| | 17 | 18 | 19 | 20 | 21 |
| Oxygen Index | 27.3 | 27.8 | 29.7 | 28.7 | 25.9 |

TABLE VI

| Composition | EXAMPLES | | | | | | | | | | | | | |
|---|---|---|---|---|---|---|---|---|---|---|---|---|---|---|
| | 37 | 38 | 39 | 40 | 41 | 42 | 43 | 44 | 45 | 46 | 47 | 48 | 49 | 50 |
| Low density polyethylene | 60 | 60 | 60 | 60 | 60 | 60 | 60 | 60 | 60 | 60 | 60 | 60 | 60 | 60 |
| Antimony trioxide | 10 | 10 | 10 | 10 | 10 | 10 | 10 | 10 | 10 | 10 | 10 | 10 | 10 | 10 |
| 1,5 COD | | | | | | | | | | 30 | 22.5 | 15 | 7.5 | — |
| BCH | | | | | — | 7.5 | 15 | 22.5 | 7.5 | | | | | |
| Diadduct of hexachlorocyclopentadiene and Furan | 30 | 22.5 | 15 | 7.5 | — | | | | | | | | | |
| Decabromodiphenyl oxide | — | 7.5 | 15 | 22.5 | 30 | 22.5 | 15 | 7.5 | — | | | | | |
| Polydibromophenylene oxide | | | | | | | | | | — | 7.5 | 15 | 22.5 | 30 |
| Oxygen Index | 26.8 | 28.9 | 29.8 | 31.6 | 27.4 | 29.9 | 33.6 | 33.2 | 32.8 | 26.9 | 30.4 | 33.4 | 30.2 | 27.4 |

EXAMPLES 22-31

Following the procedure of the preceding examples a series of fire retardant polypropylene compositions were prepared employing 1-(1,2-dibromoethyl)-3,4-dibromocyclohexane or tetrabromo-orthochlorotoluene as the brominated component. The compositions and test results are set forth in Tables III and IV below.

TABLE III

| Composition(parts by weight) | EXAMPLES | | | | |
|---|---|---|---|---|---|
| | 22 | 23 | 24 | 25 | 26 |
| Polypropylene | 60 | 60 | 60 | 60 | 60 |
| Antimony Oxide | 5 | 5 | 5 | 5 | 10 |
| Zinc Borate | 5 | 5 | 5 | 5 | — |
| 1,5 COD | 30 | 22.5 | 15 | 7.5 | — |
| 1-(1,2-dibromoethyl)-3,4-dibromocyclohexane | — | 7.5 | 15 | 22.5 | 30 |
| Oxygen Index | 27.2 | 28.9 | 25.9 | 25.4 | 28.7 |

TABLE IV

| Composition(Parts by weight) | EXAMPLES | | | | |
|---|---|---|---|---|---|
| | 27 | 28 | 29 | 30 | 31 |
| Polypropylene | 60 | 60 | 60 | 60 | 60 |
| Antimony Oxide | 5 | 5 | 5 | 5 | 5 |
| Zinc Borate | 5 | 5 | 5 | 5 | 5 |
| 1,5 COD | 30 | 22.5 | 15 | 7.5 | — |
| Tetrabromo-orthochlorotoluene | — | 7.5 | 15 | 22.5 | 30 |
| Oxygen Index | 26.5 | 28.4 | 28.8 | 26.8 | 23.4 |

A series of fire retardant low density polyethylene test samples were prepared and tested following the procedure described above except that the composition was varied as shown in Table V, below.

TABLE V

| Composition(Parts by weight) | EXAMPLES | | | | |
|---|---|---|---|---|---|
| | 32 | 33 | 34 | 35 | 36 |
| Low density polyethylene | 60 | 60 | 60 | 60 | 60 |
| Antimony Oxide | 10 | 10 | 10 | 10 | 10 |
| 1,5 COD | 30 | 22.5 | 15 | 7.5 | — |
| Bis tetrabromophthalimido ethane | — | 7.5 | 15 | 22.5 | 30 |
| Oxygen Index | 25.0 | 29.6 | 31.8 | 32.2 | 27.0 |

A series of cross-linked fire retardant polyethylene test samples was prepared and tested following the procedure described above except that the composition was varied as shown in Table VI and the procedure was varied as follows: after mixing the fire retardant additives the polyethylene was treated with dicumyl peroxide curing agent in the amount of about 6.75 parts per 100 parts of fire retardant polyethylene and was then cross-linked and compression molded for ½ hour at 160° C.

What is claimed is:

1. A fire retardant polymeric composition comprising a polyolefin polymer and an effective fire retardant proportion of the composition comprising
   (1) a brominated aromatic component selected from the group consisting of polydibromophenylene oxide, decabromodiphenyl oxide, tetrabromo-ortho-chlorotoluene, and bis tetrabromophthalimide ethane, and
   (2) a chlorinated organic component which is a diadduct of hexachlorocyclopentadiene and a polyunsaturated cyclic compound selected from the group consisting of 1,5 cyclooctadiene and furon and (3) antimony oxide 2. The composition according to claim 1 wherein the brominated aromatic component is decabromodiphenyl oxide.

3. The composition according to claim 1 wherein the brominated aromatic component is polydibromophenylene oxide.

4. The composition according to claim 1 wherein the brominated aromatic component is tetrabromo-ortho-chlorotoluene.

5. The composition according to claim 1 wherein the brominated aromatic component is bis tetrabromophthalimido ethane.

6. The composition according to claims 2 or 3 wherein the chlorinated organic component is 1,2,3,4,6,7,8,9,10,10,11,11,-dodecachloro-1,4,4a,5-,5a,6,9,9a,9b-octahydro-1,4:6,9-dimethanodibenzofuran.

7. The composition according to claim 2 wherein the chlorinated organic component is 1,4,7,10-dimethanocycloocta-1,2,3,4,7,8,9,10,13,13,14,14-dodecachloro-1,4,4a,5,6,6a,7,10,10a,11,12,12-dodecahydro(1,2,5,6)dibenzene.

8. The composition according to claim 4 wherein the chlorinated organic component is 1,4,7,10-dimethanocycloocta-1,2,3,4,7,8,9,10,13,13,14,14-dodecachloro-1,4,4a,5,6,6a,7,10,10a,11,12,12-dodecahydro(1,2,5,6)dibenzene.

9. The composition according to claim 5 wherein the chlorinated organic component is 1,4,7,10-dimethanocycloocta-1,2,3,4,7,8,9,10,13,13,14,14-dodecachloro-1,4,4a,5,6,6a,7,10,10a,11,12,12-dodecahydro(1,2,5,6)dibenzene.

10. The composition according to claim 3 wherein the chlorinated organic component is 1,4,7,10-dimethanocycloocta-1,2,3,4,7,8,9,10,13,13,14,14-dodecachloro-1,4,4a,5,6,6a,7,10,10a,11,12,12-dodecahydro(1,2,5,6)dibenzene.

11. The composition according to claim 1 wherein the polyolefin polymer is polypropylene.

12. The composition according to claim 1 wherein the polyolefin polymer is polyethylene.

13. A polymeric composition according to claim 1 wherein said brominated aromatic component and chlorinated organic component are present in a total combined amount of about 2 to about 60 percent by weight of the total polymeric composition and in a weight ratio of chlorine:bromine of between about 10:1 and about 0.1:1 and said antimony oxide is present in an amount of about 1 to about 30 percent by weight based on the total polymeric composition.

* * * * *